United States Patent
Patel et al.

(10) Patent No.: US 9,002,832 B1
(45) Date of Patent: Apr. 7, 2015

(54) CLASSIFYING SITES AS LOW QUALITY SITES

(75) Inventors: Rajan Patel, Mountain View, CA (US); Zhihuan Qiu, Sunnyvale, CA (US); Chung Tin Kwok, Mountain View, CA (US)

(73) Assignee: Google Inc., Mountain View, CA (US)

( * ) Notice: Subject to any disclaimer, the term of this patent is extended or adjusted under 35 U.S.C. 154(b) by 180 days.

(21) Appl. No.: 13/488,104

(22) Filed: Jun. 4, 2012

(51) Int. Cl.
    *G06F 17/30* (2006.01)

(52) U.S. Cl.
    CPC .................................. *G06F 17/3002* (2013.01)

(58) Field of Classification Search
    CPC ................................................ G06F 17/30899
    See application file for complete search history.

(56) References Cited

U.S. PATENT DOCUMENTS

| | | | |
|---|---|---|---|
| 7,509,344 B1 | 3/2009 | Kamvar et al. | |
| 7,533,092 B2 | 5/2009 | Berkhin et al. | |
| 7,933,984 B1 | 4/2011 | Smith et al. | |
| 7,941,391 B2 | 5/2011 | Zhou et al. | |
| 8,442,984 B1 * | 5/2013 | Pennock et al. | 707/748 |
| 2006/0095416 A1 | 5/2006 | Barkhin et al. | |
| 2009/0089373 A1 | 4/2009 | Donato et al. | |

* cited by examiner

*Primary Examiner* — Belix M Ortiz Ditren
(74) *Attorney, Agent, or Firm* — Fish & Richardson P.C.

(57) ABSTRACT

Methods, systems, and apparatus, including computer programs encoded on a computer storage medium, for enhancing search results. In one aspect, a method includes receiving a resource quality score for each of a plurality of resources linking to a site/ Each of the resources is assigned to one of a plurality of resource quality groups, each resource quality group being associated with a range of resource quality scores, each resource being assigned to the resource quality group associated with the range encompassing the resource quality score for the resource. The number of resources in each resources quality group is counted. A link quality score is determined for the site using the number of resources in each resource quality group. If the link quality score is below a threshold link quality score, the site is classified as a low quality site.

24 Claims, 4 Drawing Sheets

CLASSIFYING SITES AS LOW QUALITY SITES

BACKGROUND

This specification relates to ranking search results returned by a search engine in response to search queries submitted to the search engine.

Internet search engines aim to identify resources, e.g., web pages, images, text documents, multimedia content, that are relevant to a user's information needs and to present information about the resources in a manner that is most useful to the user. Internet search engines generally return a set of search results, each identifying a respective resource, in response to a user submitted query.

SUMMARY

In general, one aspect of the subject matter described in this specification can be embodied in methods that include the actions of receiving a resource quality score for each of a plurality of resources linking to a site; assigning each of the resources to one of a plurality of resource quality groups, each resource quality group being associated with a range of resource quality scores, each resource being assigned to the resource quality group associated with the range encompassing the resource quality score for the resource; counting the number of resources in each resource quality group; determining a link quality score for the site using the number of resources in each resource quality group; and determining that the link quality score is below a threshold link quality score and classifying the site as a low quality site because the link quality score is below the threshold link quality score. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The actions further include receiving a search query; receiving a ranking score for each of a plurality of candidate search results responsive to the search query, the plurality of candidate search results including a first candidate search result identifying the site; and as a consequence of classifying the site as a low quality site, decreasing the ranking score for the first candidate search result by an amount based on the link quality score. Determining the link quality score comprises: adding a number of resources in a first resource quality group with a number of resources in a second resource quality group to determine a sum; and dividing the sum by a total number of resources. Determining the link quality score comprises: multiplying a number of resources in a first resource quality group by a first weight to determine a first product; multiplying a number of resources in a second resource quality group by a second weight to determine a second product; adding the first product and the second product to determine a sum; and dividing the sum by a total number of resources. The actions further include identifying a plurality of candidate resources linking to the site; discarding one or more of the candidate resources, each discarded candidate resource linking to the site only from a boilerplate section of the discarded candidate resource; and including one or more remaining candidate resources in the plurality of resources for which resource quality scores are received. The actions further include identifying a plurality of candidate resources linking to the site; determining that a first plurality of the candidate resources belong to a different site; discarding all but a remaining candidate resource of the first plurality of the candidate resources belonging to the different site; and including the remaining candidate resource in the plurality of resources for which resource quality scores are received. Discarding all but a remaining candidate resource includes selecting, as the remaining candidate resource, the candidate resource having the highest resource quality score of the first plurality of the candidate resources. The actions further include identifying a plurality of candidate resources linking to the site; determining that a first plurality of the candidate resources share a same content context, the content context being a characterization of content of the resource; discarding all but a remaining candidate resource of the first plurality of the candidate resources belonging to the different site; and including the remaining candidate resource in the plurality of resources for which resource quality scores are received.

Particular embodiments of the subject matter described in this specification can be implemented so as to realize one or more of the following advantages. A search system can determine a link quality score for a site using a distribution of resource quality scores of resources linking to the site. The search system can classify the site as a low quality site if the link quality score is below a threshold score. When providing search results, the search system can decrease the ranking score of a site classified as a low quality site, which can result in higher quality sites being provided to users instead of low quality sites.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Search systems as described in this document can determine a link quality score for a given site using resource quality scores of resources linking to the given site. The search system can determine the link quality score using the distribution of the resource quality scores of the resources. The search system classifies the given site as a low quality site if the link quality score is below a threshold score.

Figure 1:
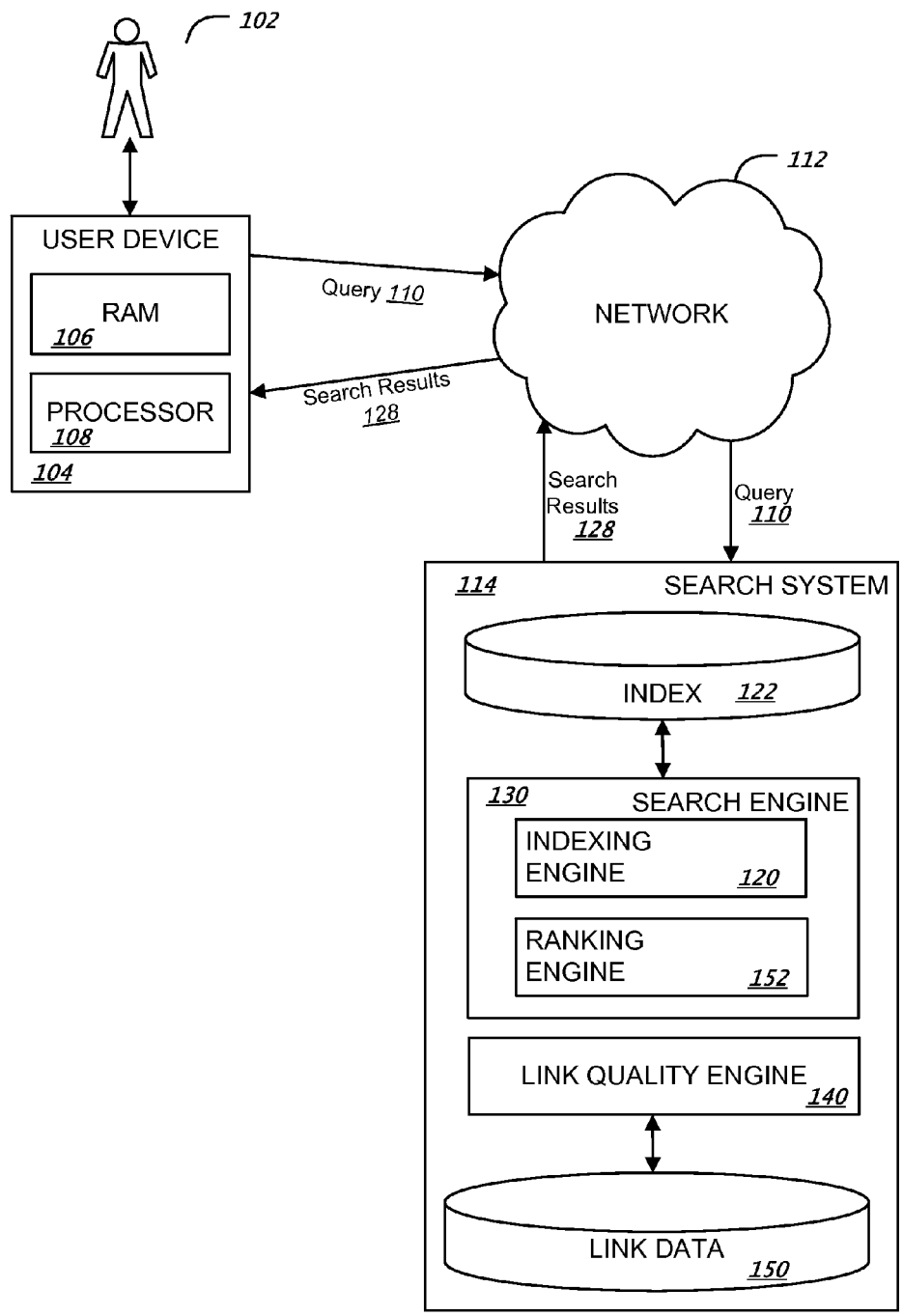
FIG. 1 shows an example search system.

FIG. 1 shows an example search system 114. The search system is an example of an information retrieval system implemented as one or more computer programs on one or more computers in one or more locations, in which the systems, components, and techniques described below can be implemented. The search system can classify sites as low quality sites and demote search results identifying resources of low quality sites.

A user 102 can interact with the search system through a user device 104. For example, the user device can be a computer coupled to the search system through a data communication network 112. The user device transmits a query 110 over the network to the search system. The search system responds by transmitting search results 128 responsive to the query to the user device. The user device 104 displays the search results, e.g., on a display device that is part of or coupled to the user device 104. In some cases, the search system can be implemented on the user device 104 itself, for example, if a user installs an application that performs searches on the user device 104.

The user device can be any appropriate type of computing device, e.g., a server, a cloud client device, a mobile phone, a tablet computer, a notebook computer, a music player, an e-book reader, a laptop or desktop computer, a PDA (personal digital assistant), a smart phone, or any other stationary or portable device. The user device will generally include a processor 108 for executing program instructions and a memory, e.g., a random access memory (RAM) 106, for storing instructions and data.

The search system includes a search engine 130. The search engine identifies resources responsive to queries. The search engine includes an indexing engine 120 that crawls a corpus of resources, e.g., the Internet or a portion of the Internet, and indexes the resources. The index information is stored in an index database 122. The index database 122 can include various types of indexes for resources, including keyword-based indexes, location-based indexes, and other indexes. The search engine also includes a ranking engine 152 that ranks resources, e.g., by quality, by relevancy to a query, or both. The ranking engine generates ranking scores for the resources that are responsive to a received query.

The search system includes a link quality engine 140 that generates link quality scores for sites. A site is a collection of resources. An example of a site is a web site that is a collection of web pages hosted on one or more web servers and accessible via a data communications network. A site can be a collection of resources organized under a domain name, e.g., a second-level or lower domain name formed by the rules and procedures of the Domain Name System (DNS).

The link quality engine 140 uses linking data 150 that specifies links from resources to sites. The linking data can be organized in a data structure having resources, sites, and links between resources and sites. The search system can generate the linking data, for example, while populating the index by parsing indexed resources for links. A link to a site is a reference from a resource to the site, e.g., a hyperlink in an outside resource to one of the resources of the site. A link can be an express link or an implied link. An express link exists where a resource explicitly refers to the site. An implied link exists where there is some other relationship between a resource and the site.

Figure 3:
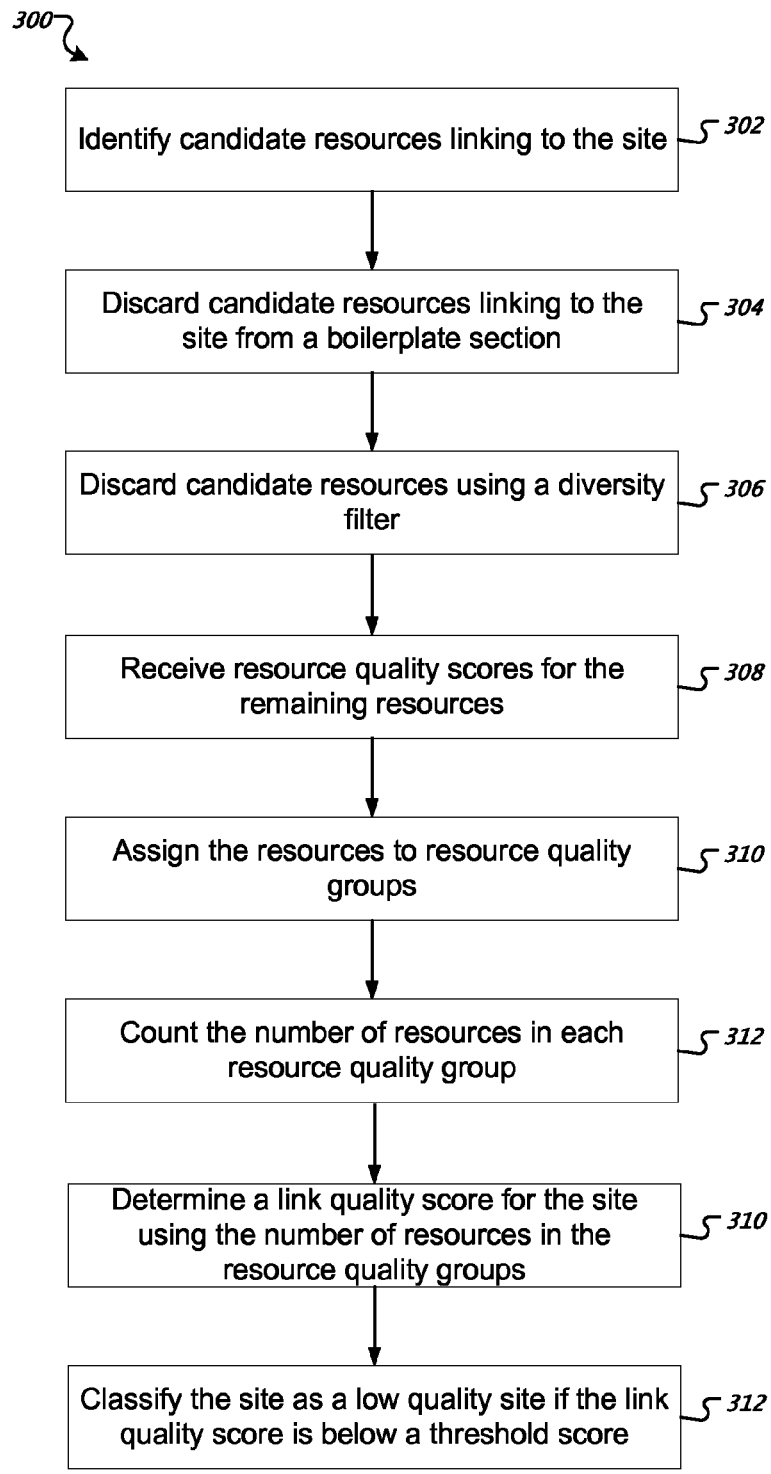
FIG. 3 is a flow chart of an example process for determining a link quality score.

To generate a link quality score for a given site, the link quality engine can perform the process illustrated in FIG. 3. In some implementations, the link quality engine generates link scores for sites having a minimum number of resources linking to the sites. The search system can then classify the given site as a low quality site if the link quality score is below a threshold score.

In some implementations, the classifications of sites as low quality sites are reviewed using one or more verification processes before the classifications are used to provide search results. When the search engine ranks search results for a query, the search engine can decrease ranking scores for search results identifying sites classified as low quality sites, e.g., by performing the process illustrated in FIG. 4.

Figure 2:
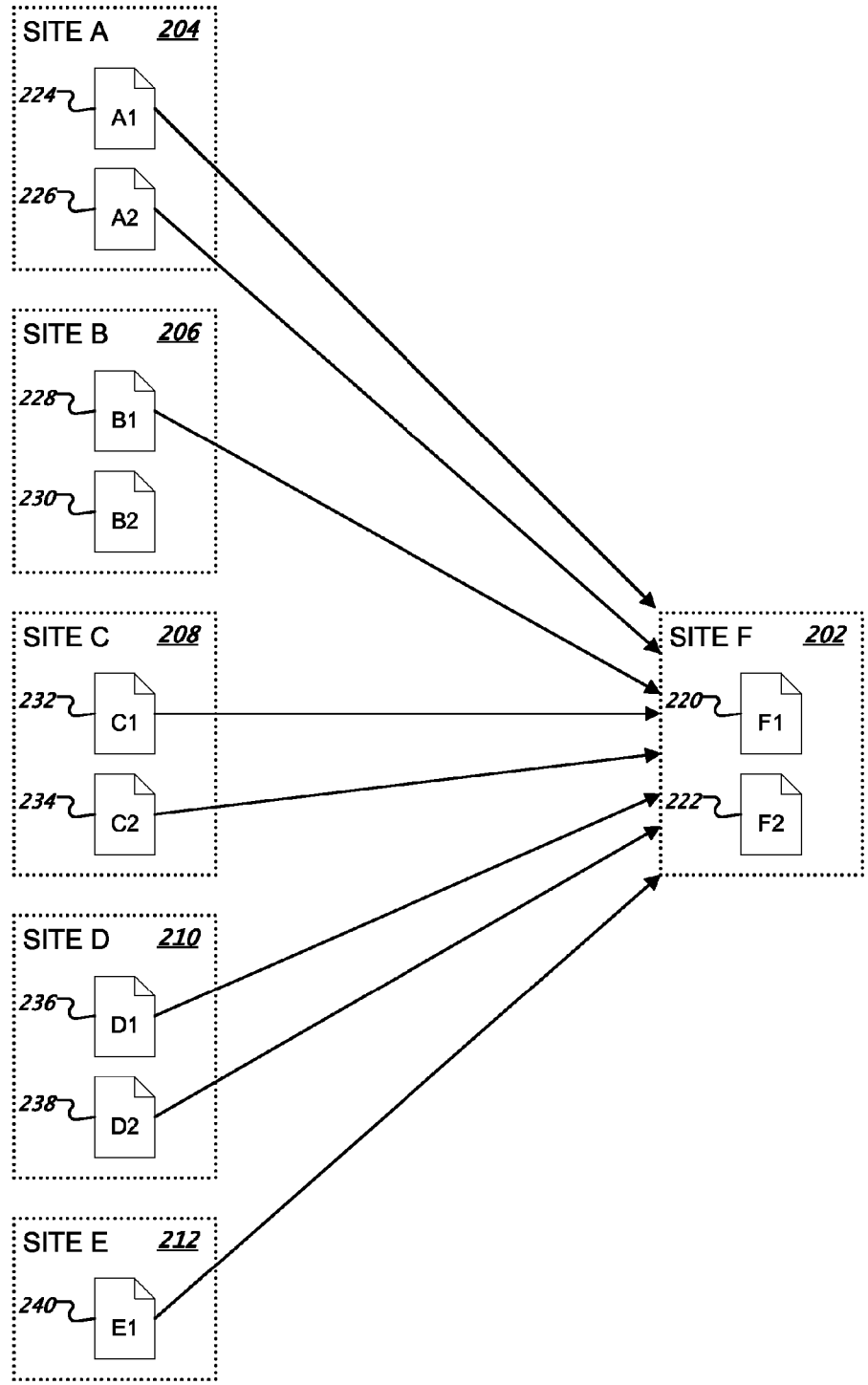
FIG. 2 illustrates an example site and a number of other example sites linking to the site.

FIG. 2 illustrates an example site F 202 and a number of other example sites A-E 204, 206, 208, 210, 212 that have links to site F. The link quality engine 140 of FIG. 1 can use resource quality scores of resources of sites A-E linking to site F to determine a link quality score for site F.

To determine the link quality score, the link engine can perform diversity filtering on the resources. Diversity filtering is a process for discarding resources that provide essentially redundant information to the link quality engine.

Consider site A, which includes two resources 224 and 226, resource A1 and resource A2, that link to site F. Because both resource A1 and resource A2 belong to the same site, site A, the link quality engine can discard one of those resources and select a representative resource quality score for both of them. For example, the link quality engine can receive resource quality scores for both resources and discard the lower resource quality score. Alternatively, the link quality engine can use a site quality score for site A instead of a resource quality score for one of the resources of site A.

Similarly, for site C, the link quality engine selects a representative resource quality score for resource C1 232 and resource C2 234 since they both link to site F. For site D, the link quality engine selects a representative resource quality score for resource D1 236 and resource D2 238 since they both link to site F.

Consider site B, which includes resources B1 228 and B2 230. Only resource B1 links to site F, so the link quality engine will use a resource quality score for resource B1 and not resource B2. Similarly, site E only includes one resource E1 240. Resource E1 links to site F so the link quality engine will use a resource quality score for resource E1.

After diversity filtering, the link quality engine will have five quality scores, typically resource quality scores but possibly site quality scores, for sites A-E. The link quality engine assigns the resources to resource quality groups and counts the number of resources in each resource quality group. The link quality engine uses the distribution of resources to determine the link quality score, e.g., as described below with reference to FIG. 3.

FIG. 3 is a flow chart of an example process 300 for determining a link quality score for a site. For convenience, the process 300 will be described as being performed by a system including one or more computing devices. For example, a search system 114, as described in reference to FIG. 1, appropriately programmed, can perform the process 300.

The system identifies candidate resources linking to the site (302). For example, the system can use the linking data 105 described with reference to FIG. 1 to identify the candidate resources.

The system optionally discards candidate resources linking to the site only from a boilerplate section (304). For example, the system can discard a web page linking to the site only from a navigation bar of the web page. The system discards candidate resources by not receiving resource quality scores for those candidate resources or by not using resource quality scores for those resources in determining the link quality score.

The system optionally discards candidate resources using a diversity filter, e.g., as described above with reference to FIG. 2 (306). The system discards candidate resources by not using them in determining the link quality score.

For example, the system can determine that a group of candidate resources all belong to a same different site, e.g., by determining that the group of candidate resources are associated with the same domain name or the same Internet Protocol (IP) address, or that each of the candidate resources in the group links to a minimum number of the same sites. In another example, the system can determine that a group of candidate resources share a same content context. A content context is a characterization of the content of a resource, e.g., a topic discussed in the resource or a machine classification of the resource.

The system can then select one candidate resource from the group, e.g., the candidate resource having the highest resource quality score, to represent the group. The system discards the other candidate resources in the group. Alternatively, the system can select one or more resources from the group. For example, if there are N candidate resources in the group, the system can select a number less than N of the candidate resources having the highest resource quality scores and discard the other candidate resources. The number can be, for example, N/2, N/4, a base 2 logarithm of N, a base ten logarithm of N, or the square root of N.

The system receives resource quality scores for the remaining resources (308). For example, the system can receive the resource quality scores from the search engine 130 of FIG. 1.

The system assigns the resources to resource quality groups (310). Each resource quality group is defined by a range of resource quality scores. The ranges can be non-overlapping. The system assigns each resource to the resource quality group defined by the range encompassing the resource quality score for the resource. In some implementations, the system assigns each resource to one of three groups, vital, good, and bad. Vital resources have the highest resource quality scores, good resource have medium resource quality scores, and bad resources have the lowest resource quality scores.

The system counts the number of resource in each resource quality group (312). The system can count the number of resources while assigning the resources to resource quality groups or after assigning the resources to resource quality groups.

The system determines a link quality score for the site using the number of resources in the resource quality groups (310). In some implementations, the system adds the number of resources in a first resource quality group to the number of resources in a second resource quality group to determine a sum. The system then divides the sum by the total number of resources to determine the link quality score.

In some implementations, the system multiplies a number of resources in a first resource quality group by a first weight to determine a first product and multiplies a number of resources in a second resource quality group by a second weight to determine a second product. The system adds the first product and the second product to determine a sum. The system divides the sum by a total number of resources to determine the link quality score.

For example, suppose that the system assigns the resources to one of three groups, vital, good, and bad. The system can determine the link quality score as follows:

$$r = \frac{w \times |vital| + |good|}{w \times |vital| + |good| + |bad|},$$

where the link quality score is r, the number of vital resources is |vital|, the number of good resources is |good|, the number of bad resources is |bad|, and w is a weight. The weight w can be, for example, 5, 10, 15 or 20.

The system classifies the site as a low quality site if the link quality score is below a threshold score (312). For example, the threshold score can be 0.05, 0.10, 0.15, or 0.20.

Figure 4:
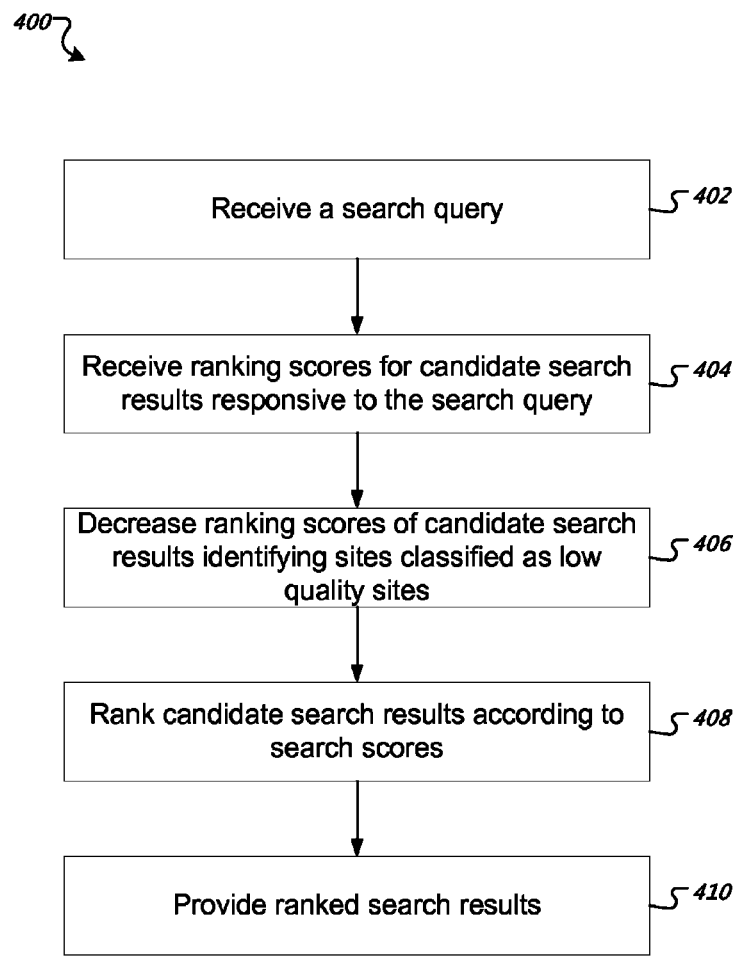
FIG. 4 is a flow chart of an example process for providing search results using link quality scores.

FIG. 4 is a flow chart of an example process 400 for providing search results using link quality scores. For convenience, the process 400 will be described as being performed by a system including one or more computing devices. For example, a search system 114, as described in reference to FIG. 1, appropriately programmed, can perform the process 300.

The system receives a search query (402). For example, the system can receive the search query from a user device 104 as described above with reference to FIG. 1.

The system receives ranking scores for candidate search results responsive to the search query (404). For example, the system can receive the ranking scores from the ranking engine 152 of FIG. 1.

The system decreases ranking scores of candidate search results identifying sites classified as low quality sites (406). The system can decrease the ranking score of a low quality site by multiplying the ranking score by an amount based on the link quality score for the site. The amount can be the square root of the link quality score, a logarithm of the link quality score, the link quality score multiplied by a weight, the link quality score itself, or another suitable determination. The system can make other adjustments to the ranking scores, e.g., using different types of quality scores.

The system ranks the candidate search results according to the ranking scores (408). The system provides the ranked search results, e.g., to the user device submitting the search query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

The term "engine" refers to one or more software modules implemented on one or more computers in one or more locations that collectively provide certain well-defined functionality, which is implemented by algorithms implemented in the modules. The software of an engine can be encoded in one or more blocks of functionality, such as a library, a platform, a software development kit, or an object. An engine can be implemented on any appropriate types of computing devices, e.g., servers, mobile phones, tablet computers, notebook computers, music players, e-book readers, laptop or desktop computers, PDAs, smart phones, or other stationary or portable devices, that includes one or more processors and computer-readable media. Additionally, two or more engines may be implemented on the same computing device or devices.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving a resource quality score for each of a plurality of resources linking to a site;
   assigning each of the resources to one of a plurality of resource quality groups, each resource quality group being associated with a range of resource quality scores, each resource being assigned to the resource quality group associated with the range encompassing the resource quality score for the resource;
   counting the number of resources in each resource quality group;
   determining a link quality score for the site using the number of resources assigned to each resource quality group, wherein determining the link quality score comprises:
      multiplying a number of resources in a first resource quality group by a first weight to determine a first product;
      multiplying a number of resources in a second resource quality group by a second weight to determine a second product;
      adding the first product and the second product to determine a sum; and
      determining a ratio using the sum and a total number of resources; and
   determining that the link quality score is below a threshold link quality score and classifying the site as a low quality site because the link quality score is below the threshold link quality score.

2. The method of claim 1, further comprising:
   receiving a search query;
   receiving a ranking score for each of a plurality of candidate search results responsive to the search query, the plurality of candidate search results including a first candidate search result identifying the site; and
   as a consequence of classifying the site as a low quality site, decreasing the ranking score for the first candidate search result by an amount based on the link quality score.

3. The method of claim 1, wherein determining the ratio using the sum and the total number of resources comprises:
   dividing the sum by the total number of resources.

4. The method of claim 1, further comprising:
   identifying a plurality of candidate resources linking to the site;
   discarding one or more of the candidate resources, each discarded candidate resource linking to the site only from a boilerplate section of the discarded candidate resource; and
   including one or more remaining candidate resources in the plurality of resources for which resource quality scores are received.

5. The method of claim 1, further comprising:
   identifying a plurality of candidate resources linking to the site;
   determining that a first plurality of the candidate resources belong to a different site;
   discarding all but a remaining candidate resource of the first plurality of the candidate resources belonging to the different site; and
   including the remaining candidate resource in the plurality of resources for which resource quality scores are received.

6. The method of claim 5, wherein discarding all but a remaining candidate resource includes selecting, as the remaining candidate resource, the candidate resource having a highest resource quality score of the first plurality of the candidate resources.

7. The method of claim 5, further comprising:
   identifying a plurality of candidate resources linking to the site;
   determining that a first plurality of the candidate resources share a same content context, the content context being a characterization of content of the resource;
   discarding all but a remaining candidate resource of the first plurality of the candidate resources belonging to the different site; and
   including the remaining candidate resource in the plurality of resources for which resource quality scores are received.

8. A system of one or more computers configured to perform operations comprising:
   receiving a resource quality score for each of a plurality of resources linking to a site;
   assigning each of the resources to one of a plurality of resource quality groups, each resource quality group being associated with a range of resource quality scores, each resource being assigned to the resource quality group associated with the range encompassing the resource quality score for the resource;
   counting the number of resources in each resource quality group;
   determining a link quality score for the site using the number of resources assigned to each resource quality group, wherein determining the link quality score comprises:
      multiplying a number of resources in a first resource quality group by a first weight to determine a first product;
      multiplying a number of resources in a second resource quality group by a second weight to determine a second product;
      adding the first product and the second product to determine a sum; and
      determining a ratio using the sum and a total number of resources; and
   determining that the link quality score is below a threshold link quality score and classifying the site as a low quality site because the link quality score is below the threshold link quality score.

9. The system of claim 8, the operations further comprising:
   receiving a search query;
   receiving a ranking score for each of a plurality of candidate search results responsive to the search query, the plurality of candidate search results including a first candidate search result identifying the site; and
   as a consequence of classifying the site as a low quality site, decreasing the ranking score for the first candidate search result by an amount based on the link quality score.

10. The system of claim 8, wherein method of claim 1, wherein determining the ratio using the sum and the total number of resources comprises:
   dividing the sum by the total number of resources.

11. The system of claim 8, the operations further comprising:

identifying a plurality of candidate resources linking to the site;
discarding one or more of the candidate resources, each discarded candidate resource linking to the site only from a boilerplate section of the discarded candidate resource; and
including one or more remaining candidate resources in the plurality of resources for which resource quality scores are received.

12. The system of claim 8, the operations further comprising:
identifying a plurality of candidate resources linking to the site;
determining that a first plurality of the candidate resources belong to a different site;
discarding all but a remaining candidate resource of the first plurality of the candidate resources belonging to the different site; and
including the remaining candidate resource in the plurality of resources for which resource quality scores are received.

13. The system of claim 12, wherein discarding all but a remaining candidate resource includes selecting, as the remaining candidate resource, the candidate resource having a highest resource quality score of the first plurality of the candidate resources.

14. The system of claim 12, the operations further comprising:
identifying a plurality of candidate resources linking to the site;
determining that a first plurality of the candidate resources share a same content context, the content context being a characterization of content of the resource;
discarding all but a remaining candidate resource of the first plurality of the candidate resources belonging to the different site; and
including the remaining candidate resource in the plurality of resources for which resource quality scores are received.

15. A computer storage medium encoded with a computer program, the program comprising instructions that when executed by one or more computers cause the one or more computers to perform operations comprising:
receiving a resource quality score for each of a plurality of resources linking to a site;
assigning each of the resources to one of a plurality of resource quality groups, each resource quality group being associated with a range of resource quality scores, each resource being assigned to the resource quality group associated with the range encompassing the resource quality score for the resource;
counting the number of resources in each resource quality group;
determining a link quality score for the site using the number of resources assigned to each resource quality group, wherein determining the link quality score comprises:
multiplying a number of resources in a first resource quality group by a first weight to determine a first product;
multiplying a number of resources in a second resource quality group by a second weight to determine a second product;
adding the first product and the second product to determine a sum; and
determining a ratio using the sum and a total number of resources; and determining that the link quality score is below a threshold link quality score and classifying the site as a low quality site because the link quality score is below the threshold link quality score.

16. The computer storage medium of claim 15, the operations further comprising:
receiving a search query;
receiving a ranking score for each of a plurality of candidate search results responsive to the search query, the plurality of candidate search results including a first candidate search result identifying the site; and
as a consequence of classifying the site as a low quality site, decreasing the ranking score for the first candidate search result by an amount based on the link quality score.

17. The computer storage medium of claim 15, wherein method of claim 1, wherein determining the ratio using the sum and the total number of resources comprises:
dividing the sum by the total number of resources.

18. The computer storage medium of claim 15, the operations further comprising:
identifying a plurality of candidate resources linking to the site;
discarding one or more of the candidate resources, each discarded candidate resource linking to the site only from a boilerplate section of the discarded candidate resource; and
including one or more remaining candidate resources in the plurality of resources for which resource quality scores are received.

19. The computer storage medium of claim 15, the operations further comprising:
identifying a plurality of candidate resources linking to the site;
determining that a first plurality of the candidate resources belong to a different site;
discarding all but a remaining candidate resource of the first plurality of the candidate resources belonging to the different site; and
including the remaining candidate resource in the plurality of resources for which resource quality scores are received.

20. The computer storage medium of claim 19, wherein discarding all but a remaining candidate resource includes selecting, as the remaining candidate resource, the candidate resource having a highest resource quality score of the first plurality of the candidate resources.

21. The computer storage medium of claim 19, the operations further comprising:
identifying a plurality of candidate resources linking to the site;
determining that a first plurality of the candidate resources share a same content context, the content context being a characterization of content of the resource;
discarding all but a remaining candidate resource of the first plurality of the candidate resources belonging to the different site; and
including the remaining candidate resource in the plurality of resources for which resource quality scores are received.

22. The method of claim 1, wherein:
the first weight is greater than 1, second weight is equal to 1, and the second product is equal to the number of resources in a second resource quality group; and
determining the link quality score for the site further comprises:

determining the ratio by adding the first product and the second product to determine a numerator, adding the first product and the number of resources in the resource quality groups other than the first resource quality group to determining a denominator, and dividing the numerator by the denominator to determine the ratio.

23. The system of claim 9, wherein:
the first weight is greater than 1, second weight is equal to 1, and the second product is equal to the number of resources in a second resource quality group; and
determining the link quality score for the site further comprises:
  determining the ratio by adding the first product and the second product to determine a numerator, adding the first product and the number of resources in the resource quality groups other than the first resource quality group to determining a denominator, and dividing the numerator by the denominator to determine the ratio.

24. The computer storage medium of claim 15, wherein:
the first weight is greater than 1, second weight is equal to 1, and the second product is equal to the number of resources in a second resource quality group; and
determining the link quality score for the site further comprises:
  determining the ratio by adding the first product and the second product to determine a numerator, adding the first product and the number of resources in the resource quality groups other than the first resource quality group to determining a denominator, and dividing the numerator by the denominator to determine the ratio.

\* \* \* \* \*